United States Patent [19]

Armstrong et al.

[11] Patent Number: 5,130,588
[45] Date of Patent: Jul. 14, 1992

[54] CYLINDRICAL COMPOSITE SUPERCONDUCTOR BEARING

[75] Inventors: Timothy R. Armstrong, Palos Verdes Estates; John R. Esopa, Hermosa Beach; Thomas K. Rigney, II, Torrance; Marshall P. Saville, Lawndale, all of Calif.

[73] Assignee: Allied-Signal Inc., Morris Township, Morris County, N.J.

[21] Appl. No.: 651,839

[22] Filed: Feb. 6, 1991

[51] Int. Cl.$^5$ .................. H02K 21/06; F16C 39/06; H02N 15/04
[52] U.S. Cl. .................................. 310/90.5; 505/1; 505/876
[58] Field of Search ................. 310/90.5; 505/1, 733, 505/876

[56] References Cited

U.S. PATENT DOCUMENTS

| | | |
|---|---|---|
| 4,797,386 | 1/1989 | Gyorgy et al. . |
| 4,939,120 | 7/1990 | Moon et al. ............... 310/90.5 |
| 4,954,481 | 9/1990 | DeReggi et al. ............ 505/1 |
| 4,975,415 | 12/1990 | Gusman et al. ............ 505/1 |

OTHER PUBLICATIONS

Defense Technical Information Center Superconducting Bearing and Levitation Newsletter, No. 1, Mar. 1990, Francis C. Moon, Editor.

*Primary Examiner*—Steven L. Stephan
*Assistant Examiner*—D. L. Rebsch
*Attorney, Agent, or Firm*—David B. Abel; Robert A. Walsh

[57] ABSTRACT

A cylindrical superconductor bearing is made of Type II ceramic superconductor, dispersed in an acrylic thermoplastic carrier in a ratio between 1:1 and 3:1 by volume. The cylindrical superconductor bearing is particularly useful as a magnetic journal bearing.

17 Claims, 4 Drawing Sheets

CYLINDRICAL COMPOSITE SUPERCONDUCTOR BEARING

The invention was made with Government Support under Contract No. N00014-88-C-0668, awarded by the Department of the Navy. The Government has certain rights in this invention.

BACKGROUND OF THE INVENTION

This invention relates in general to superconducting composite materials and in particular to a superconducting bearing composed of a matrix of acrylic thermoplastic and superconducting powder.

The Meissner effect is the expulsion of applied magnetic flux to a superconductor. With Type I superconductors, there is a complete Meissner effect with total expulsion of applied magnetic flux. Type II superconductors are those which have a significantly higher temperature Tc at which they exhibit superconductivity. However, the Type II superconductors exhibit a partial Meissner effect combined with a "flux pinning" effect, wherein a portion of a magnetic field placed proximate the Type II superconductor does penetrate the superconductor, and is essentially fixed in place.

High-temperature Type II superconductors are potentially important for a variety of applications such as electrical conductors, shields of magnetic flux, field induced magnets, and passive magnetic or flux trapping bearings. For the flux shield, magnets, and bearing applications, the superconductor may need to be fabricated into a wide variety of shapes and sizes. These shapes can range from simple discs to more complex forms. However, to optimize the properties necessary for these applications, the superconductor material must be processed to promote the formation of long, aligned grains. This type of processing is not readily conducive to the fabrication of even simple shapes. Therefore, a novel approach to fabricating high-temperature superconductors is needed.

BRIEF SUMMARY OF THE INVENTION

The present invention is directed to a method of producing a Type II ceramic superconductor, dispersed in an acrylic thermoplastic carrier, to yield a readily formable, thermosetting superconductor composite. The superconductor composite is particularly useful as a magnetic bearing or as devices to trap or shield magnetic flux.

DETAILED DESCRIPTION OF THE PREFERRED EMBODIMENT

Figure 1:
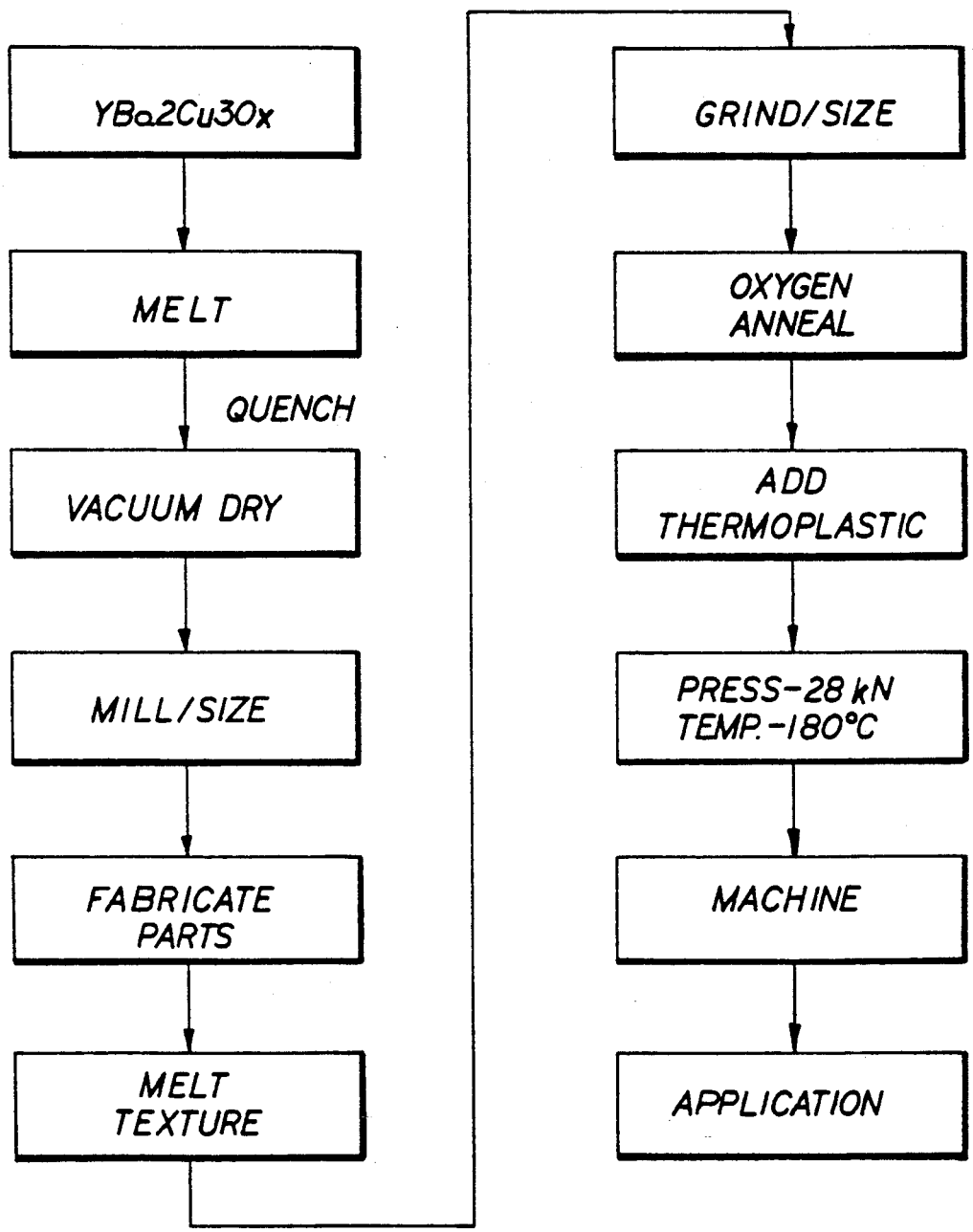
FIG. 1 depicts a flow chart of the process steps of formulating the superconducting composite of the present invention.

The process steps required to formulate the superconductor composite are shown in FIG. 1. A superconducting ceramic precursor material, such as $YBa_2Cu_3O_{7-x}$ powder, is first melted at temperatures in the range 1300° to 1400° for 5-10 minutes. The melt is then rapidly quenched to solidify the material in a homogeneous subatomic lattice. This may best be accomplished by pouring the melted material over copper plates that are cooled to liquid nitrogen temperatures 770 K). The quenched $YBa_2Cu_3O_{7-x}$ material is a black, brittle amorphous solid. This solid is then vacuum dried to remove any moisture that has condensed on the surface. Next, the amorphous solid is ground to a fine powder with an average particle size which is preferably not greater than 175 microns. The fine powder is then pressed into bulk shapes such as disks or cylinders and subsequently melt textured in a heat treating process.

The melt texturing heat treatment consists of heating the pressed material to temperatures above the liquidus temperature. For the $YBa_2Cu_3O_{7-x}$ superconducting material, the liquidus temperature is about 1030° C.; thus, the melt texturing is carried out at between 1050° C. to 1275° C. The material is held at the melt temperature for a time period sufficient to allow liquid to form, generally at least 20 minutes.

The material is then cooled at an initial rate of approximately 100° C./hour to a temperature of about 1000° C. This relatively rapid step is followed by a controlled cooling, where the cooling rate is adjusted to be no greater than about 10° C./h until the material is cooled to 900° C. This slow cooling promotes the growth of relatively long grains, i.e. grains having a length greater than 1 mm. This process can also be adapted to promote the growth of uniformly sized grains having any desired length up to slightly greater than 1 cm. Thus, as discussed, below an optimal grain size which can be then ground to a preferred particle size, for example about 0.7 mm (700 microns), can be obtained by a adjusting the combination of initial melt temperature and cooling rate factors.

The material is then cooled at a rate of 60° C./h to a temperature of about 625° C., at which point the cooling rate is lowered to 10° C./h. This lower cooling rate is maintained until the material temperature reaches about 375° C., to allow the material to transform from the tetragonal to the orthorhombic crystal structure. The material is then cooled to room temperature.

The melt textured solid superconductor is then ground to a fine powder, having a particle size distribution between 20 microns and 1 mm in size. The optimal size of the resulting ground particles, is believed to be in the range of between 600 to 800 microns. The superconductor powder is then sized by sieving through gradated screens.

The heat treated and sized superconductor powder is next annealed in a second heat treatment carried out in an oxygen atmosphere. It is preferred to anneal the sized powder, as opposed to the bulk textured material, because of the higher surface area of the ground powder. During this annealing process, the material is heated slowly in the oxygen atmosphere to a temperature in the range of between 400° C. to 800° C. and maintained at this temperature for 24 to 96 hours, preferably about 48 hours, to allow oxygen to diffuse into the material structure. This oxygen annealing step aids the transformation of the $O_{7-x}$ crystalline structure. The material is then cooled at a rapid rate, such as 200° to 300° C./hour, to room temperature.

The sized, annealed superconductor powder is subsequently mixed with a polymer such as an acrylic thermoplastic in the ratios 1:1 to 3:1. The sized superconducting powders may be selected to have an approximately uniform particle size, or alternatively, a selected gradation, combination, or distribution of particle sizes may be optimal.

The acrylic thermoplastic such as methyl methacrylate is selected as having a resistance to degradation, either by cracking or decomposing, which is maintained when cooled to a temperature less than the Tc of the selected superconductor material. The superconductor-acrylic composite mixture is ball milled with zirconia balls for 5 to 20 minutes to promote uniform wetting of the superconductor particles and insure a homogeneous distribution of acrylic and superconductor. The mixture is placed or injected into a mold of a press, and compacted under approximately 28 kN of pressure at a temperature of about 180° C. for approximately nine minutes. The sample is allowed to cool for three minutes and is then removed from the press. The result is a two-phase composite structure that combines the flux exclusion and flux pining properties of the superconductor (when cooled to a temperature below the superconductors' Tc) with the toughness and flexibility of a polymeric material. However, since the superconductor material is not continuous through the sample, the composite will not exhibit the zero resistance to electrical current property of a pure superconductor.

The resulting composite structures are easily machined, if required, and can withstand cryogenic temperatures without brittle fracture. It should be noted that the final molding and pressing of the composite material can be carried out to produce a bulk material having a gross net shape in any injection moldable configuration.

Figure 2:
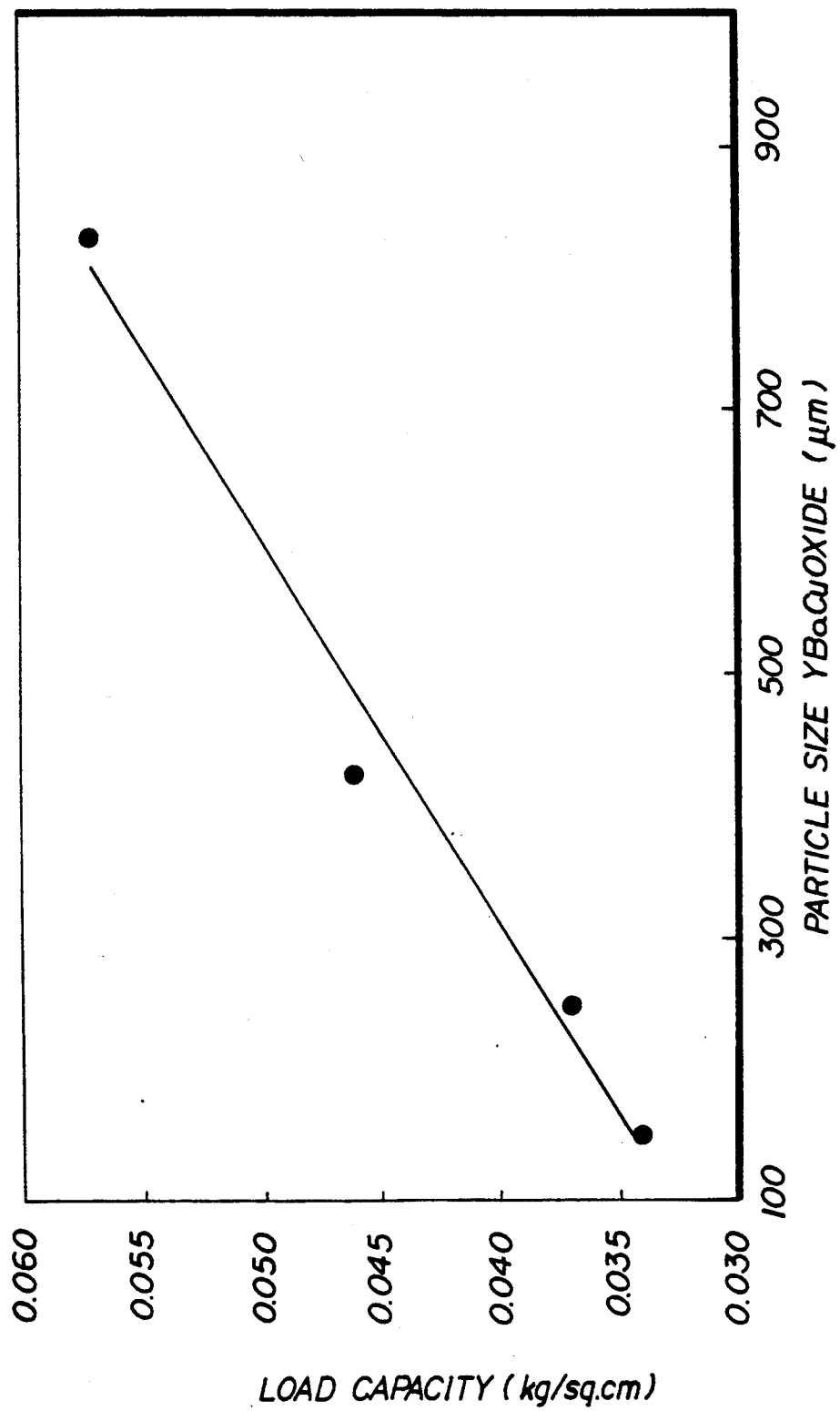
FIG. 2 is a graph plotting particle size as a function of bearing load capacity.

FIG. 2 is a graph plotting particle size on the X-axis and bearing load capacity on the Y-axis for the superconductor composite formulated according to the above procedure using a $YBa_2Cu_3O_7$ superconductor material. The data for the graph was generated using 70% by volume of superconductor and 30% by volume acrylic thermoplastic. The graph suggests an increased load capacity as a function of particle size occurs when the particle size increases, particularly for particle sizes in the range of between about 600 and 800 microns.

Figure 3:
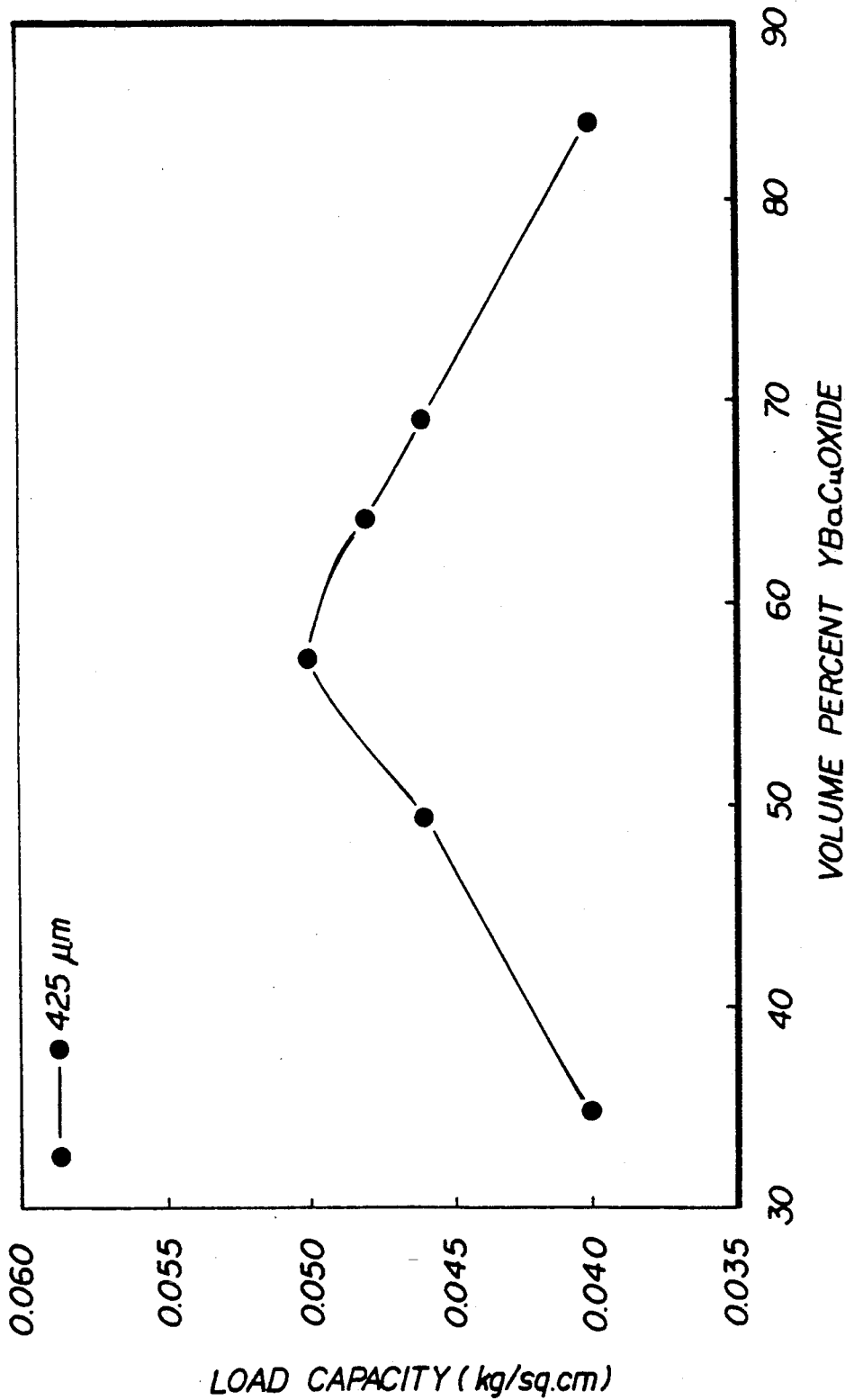
FIG. 3 is a graph plotting volume percentage of superconductor in the composite as a function of bearing load capacity.

FIG. 3 is a graph plotting volume percentage of superconductor in the composite on the X-axis and bearing load capacity on the Y-axis for the superconductor composite formulated according to the above procedure using a $YBa_2Cu_3O_7$ superconductor material. The data for this graph was generated using a mean particle size of 425 microns. The graph indicates that the bearing load capacity increases as the volume percentage of superconductor material is increased up to between fifty five to sixty percent. Surprisingly however, the bearing load capacity actually decreases when the percentage of superconductor material is further increased. Thus, for the $YBa_2Cu_3O_7$ superconductor based composite, the preferred volume percentage of superconductor is in the range of between about fifty to seventy percent, and optimally between about fifty five to sixty percent. It is currently believed that this is the preferred range required to minimize the amount of acrylic thermoplastic yet still hold the superconductor particles together. Samples made with lower amounts of acrylic do not hold together as well, tending to deteriorate with time.

The phenomena of a maximum load bearing capacity for the superconductor composite may result from two factors. First, a pure type II superconductor exhibits both partial magnetic flux exclusion and magnetic "flux pinning". Flux pinning is the result of a magnetic field being induced into the superconductor, and the resistance to change or displacement of this induced magnetic field in the superconductor combined with the resultant external magnetic field. The superconductor particles in the superconductor composite also exhibit both the flux exclusion and flux pinning properties. A portion of the magnetic flux can be visualized as penetrating the composite's acrylic matrix along the magnetically invisible acrylic thermoplastic between the discreet superconductor particles held in the acrylic matrix. This magnetic flux traversing through the acrylic matrix is at least partially excluded from penetrating the superconductor particles, while also inducing flux pining in the particles. The interaction of these two phenomena between and about the superconducting particles in the acrylic matrix changes the nature of the magnetic field internal to the composite, potentially increasing the flux pining property as viewed from a position external to the superconductor composite.

The second aspect concerns the magnetic fields established in the superconductor particles to support the flux pining magnetic fields. In the composite superconductor, the acrylic matrix acts to separate the superconducting particles. Thus, the magnetic fields are constrained in the individual superconducting particles, polarizing the individual particles with the axes of polarity being all generally in alignment along the magnetic field lines of the inducing magnetic field.

Figure 4:
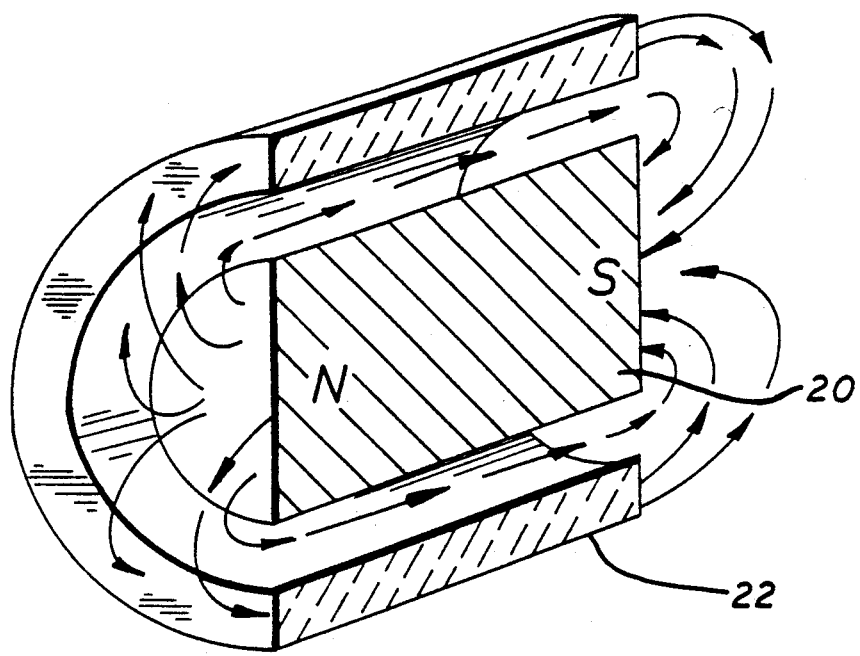
FIG. 4 depicts a simplified cross section of a magnet levitated with respect to a superconducting composite cylinder.

FIG. 4 depicts a bearing design which utilizes the inherent characteristics of a Type II superconductor composite to create a bearing design that supports both the axial and the radial loads of a rotating shaft. Type I superconductors as well as conventional passive magnetic bearings have been shown to have rotor stability problems often requiring sophisticated positioning and stabilizing electronics. For the present bearing design, however, Type II superconductor composites formulated according to the above process, such as $YBa_2Cu_3O_{7-x}$ dispersed in an acrylic thermoplastic, exhibit only a partial Meissner effect since some of the applied magnetic flux becomes pinned in the matrix when the temperature is reduced below the superconductors critical temperature $T_c$ (for $YBa_2Cu_3O_{7-x}$, $T_c=(77°K)$. This magnetic flux pinning in the superconductor composite bearing disk generates a bearing having a high magnetic stability.

As depicted schematically in FIG. 4, a rare earth cylindrical magnet 20 having sufficient magnetic field strength and magnetized along the axis is placed inside a hollow superconductor composite cylinder 22. The superconductor composite cylinder 22 is preferably a $YBa_2Cu_3O_x$ thermoplastic acrylic composite formulated as discussed above. The superconductor composite cylinder 22 is chilled (before or after the magnet 20 is drawn near) to below the superconductor's $T_c$. The magnet 20 levitates axially within the superconductor composite cylinder 22. The cylindrical magnet 20 can be easily made to spin on its axis with very little resistance. In addition, the magnet 20 exhibits a resistance to both axial and radial applied forces.

This combination of low resistance to rotation and relatively high axial and radial force resistance is attributed to the flux pinning and flux exclusion within the superconductor composite cylinder 22, and the orientation of the magnetic field of the magnet 20 with respect to the superconductor composite cylinder 22. When the magnetic axis of the cylindrical magnet 20 is generally aligned with the axis of the superconductor composite cylinder, the magnetic field which penetrates the cylinder 22 is symmetrical and axially aligned with the magnetic axis of the magnet 20. Thus, rotation of the magnet 20 about its magnetic axis does not alter the magnetic flux distribution which is pinned in the superconducting material of the disk 22. However, translation of the magnet 20 in either the radial or axial direction with respect to the cylinder 22 will result in a change in the magnetic flux distribution which is pinned in the superconducting material of the cylinder 22. Since the Type II superconductor resists any change in a pinned magnetic flux, the flux pinning will produce a resisting force countering either axial or radial motion of the magnet 20, in effect aiding the Meissner effect thrust exclusion which produces a majority of the radial load resistance capability.

Figure 5:
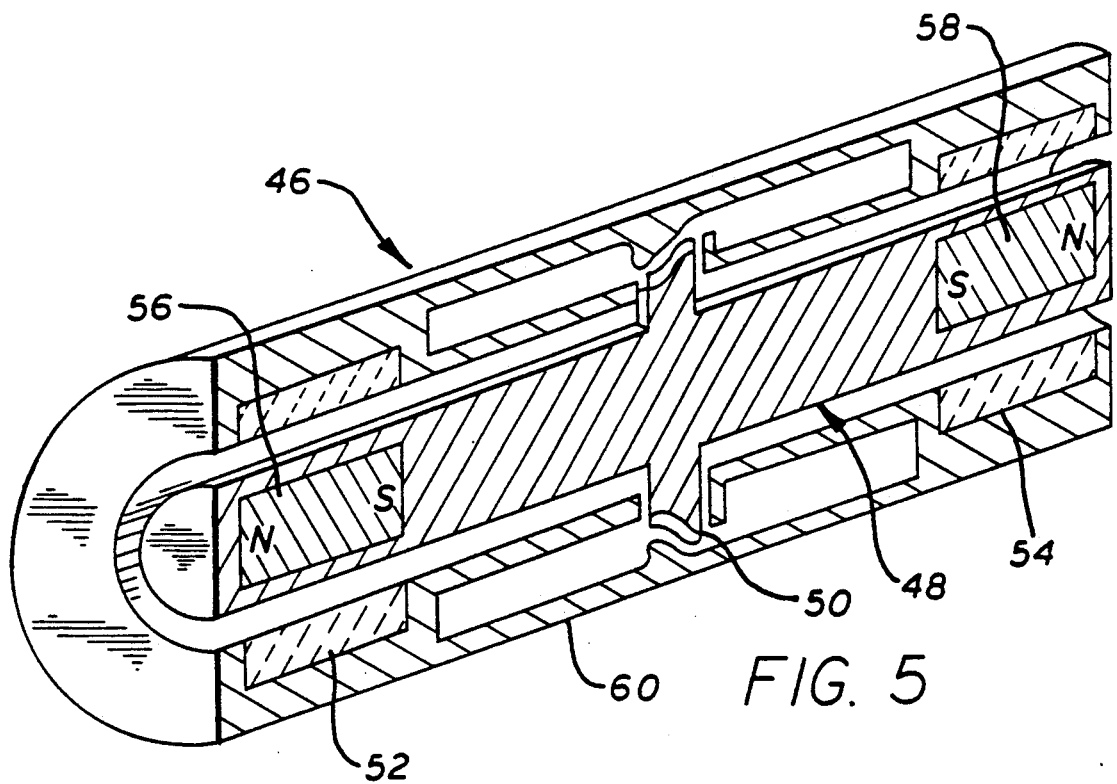
FIG. 5 depicts a magnetic bearing design including superconductor composite cylinders fabricated according to the method of FIG. 1.

These phenomena allow for the design and construction of a bearing system 46 that supports small rotors 48 as depicted in FIG. 5. The rotor 48 may include compressors and/or turbines 50 for rotating machinery. A bearing similar in concept to this design, is described in applicants' co-pending patent application no. 07/652,341, filed concurrently herewith and incorporated herein by reference. In this application, the bearing can withstand stronger rotor thrust loads than radial (journal) loads. To increase the radial load capacity, a totally enclosed journal/thrust bearing is necessary.

The bearing system 46 includes two superconductor composite cylinders 52, 54 which are 1.2 cm thick and 2.5 cm long, having a 1.8 cm outer diameter. The rotor 48, includes two, 3000 Gauss, 18 Mgo, samarium-cobalt cylindrical magnets 56, 58 one of which is inserted into each end of the rotor 48. The rotor 48 is configured such that the magnets 56, 58 are inserted inside of the superconductor composite cylinders 52, 54, respectively, with a diametrical clearance between the magnets 56, 58 and the superconductor composite cylinders 52, 54 of 0.12 cm. The rotor 48 is levitated in either a horizontal or vertical orientation between the superconductor composite cylinders 52, 54, resisting both radial and axial applied loads. As depicted, the superconductor composite cylinders 52, 54 are mounted within a housing assembly 60 which also contains the rotor 48. The housing assembly 60 allows for means for maintaining the proper temperatures for the superconductor materials, such as by circulation of a refrigerant through the housing assembly 60.

It should be evident from the foregoing description that the present invention provides advantages in the fabrication and use of superconductors in magnetic bearing applications. Although preferred embodiments are described herein, it will be appreciated that many modifications and variations of the present invention are possible in light of the above teaching. Therefore, the scope of the present invention is limited only by the appended claims.

We claim:
1. A magnetic bearing system comprising:
   a pair of relatively rotatable members;
   a hollow cylinder of superconducting composite having a Type II superconductor powder and an acrylic thermoplastic blended in a ratio between 1:1 and 3:1 by volume, said cylinder attached to one of said relatively rotatable members; and
   means for generating a magnetic field symmetric about the axis of rotation of said relatively rotatable members, said means attached to the second of said relatively rotatable members and coaxially disposed within said cylinder of superconductor composite.

2. The magnetic bearing system of claim 1, wherein said superconductor composite has a volume percentage of said ceramic superconductor in the range between about fifty and seventy percent of said superconductor composite.

3. The magnetic bearing system of claim 1 wherein said ceramic superconductor powder has a median particle size in the range between 600 and 800 microns.

4. The magnetic bearing system of claim 1 wherein said ceramic superconductor powder is Yttrium-Barrium-Copper-Oxide having an atomic formula $YBa_2Cu_3O_7$ and a particle distribution of between 20 microns and 1 mm in size.

5. The magnetic bearing system of claim 4, wherein said superconductor composite has a volume percentage of said ceramic superconductor composite has a volume percentage of said ceramic superconductor in the range between about fifty five and sixty percent of said superconductor composite.

6. The magnetic bearing system of claim 4 wherein said ceramic superconductor powder has a median particle size in the range between 600 and 800 microns.

7. The magnetic bearing system of claim 1, wherein said acrylic thermoplastic is methyl methacrylate.

8. The magnetic bearing system of claim 1, further comprising:
   a second cylinder of superconducting composite having a ceramic superconductor powder and an acrylic thermoplastic blended in a ratio between 1:1 and 3:1 by volume, said second cylinder attached to the same one of said relatively rotatable members as said other cylinder; and
   second means for generating a magnetic field symmetric about the axis of rotation of said relatively rotatable members, said second means attached to the second of said relatively rotatable members and coaxially disposed within said second cylinder of superconductor composite.

9. The magnetic bearing system of claim 8, wherein said cylinders of superconductor composite have a volume percentage said ceramic superconductor in the range of between about fifty and seventy percent of said superconductor composite.

10. The magnetic bearing system of claim 8 wherein said ceramic superconductor powder has a median particle size in the range between 600 and 800 microns.

11. The magnetic bearing system of claim 8 wherein said ceramic superconductor powder is Yttrium-Barrium-Copper-Oxide having an atomic formula $YBa_2Cu_3O_7$ and a particle distribution of between 20 microns and 1 mm in size.

12. The magnetic bearing system of claim 11, wherein said superconductor composite has a volume percentage of said ceramic superconductor in the range between about fifty five and sixty percent of said superconductor composite.

13. The magnetic bearing system of claim 11 wherein said ceramic superconductor powder has a median particle size in the range of between 600 and 800 microns.

14. The magnetic bearing system of claim 1, wherein said means for generating a magnetic field is a cylindrical magnet magnetized axially, said cylindrical magnet mounted coaxially with said axis of rotation of said relatively rotatable members.

15. The magnetic bearing system of claim 8, wherein said means for generating said magnetic fields is a pair of cylindrical magnets magnetized axially, said cylindrical magnets mounted coaxially within said relatively rotatable members.

16. The magnetic bearing system of claim 1, wherein said member including said means for generating said magnetic field is a rotating assembly and said member including said cylinder of superconductor composite is a housing assembly containing said rotating assembly.

17. The magnetic bearing system of claim 8, wherein said member including said means for generating said magnetic fields is a rotating assembly and said member including said cylinders of superconductor composite is a housing assembly containing said rotating assembly.

* * * * *